United States Patent
Fall et al.

(10) Patent No.: US 7,260,329 B1
(45) Date of Patent: Aug. 21, 2007

(54) ALL OPTICAL TIME DIVISION MULTIPLEXER AND PACKET SWITCH USING OPTICAL CODEWORDS AND OPTICALLY ACTUATED OPTICAL SWITCHES

(75) Inventors: Thomas C. Fall, Los Gatos, CA (US); Ralph Spickermann, Redwood City, CA (US); Daniel A. Tauber, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 569 days.

(21) Appl. No.: 10/932,223

(22) Filed: Sep. 1, 2004

(51) Int. Cl.
 *H04J 14/08* (2006.01)
 *H04J 14/00* (2006.01)
 *H04B 10/04* (2006.01)

(52) U.S. Cl. .................. 398/102; 398/52; 398/98; 398/182

(58) Field of Classification Search .................. 398/42, 398/52, 98–103, 111, 158, 161, 182, 201
 See application file for complete search history.

(56) References Cited

U.S. PATENT DOCUMENTS

2004/0178935 A1* 9/2004 Iio et al. ..................... 341/100

* cited by examiner

*Primary Examiner*—Jason Chan
*Assistant Examiner*—David Lee
(74) *Attorney, Agent, or Firm*—Kenneth W. Float

(57) ABSTRACT

Optical apparatus that uses optically-actuated optical switches in conjunction with an optical codeword addressing scheme to provide for time division multiplexing and demultiplexing of high data rate optical data. Optical codewords traveling simultaneously with the data on a separate wavelength, in conjunction with the optical switches, enable all-optical multiplexing and demultiplexing. The present invention can also switch packets of data while keeping the data entirely in the optical domain, and no optical to electrical conversions are necessary.

13 Claims, 8 Drawing Sheets

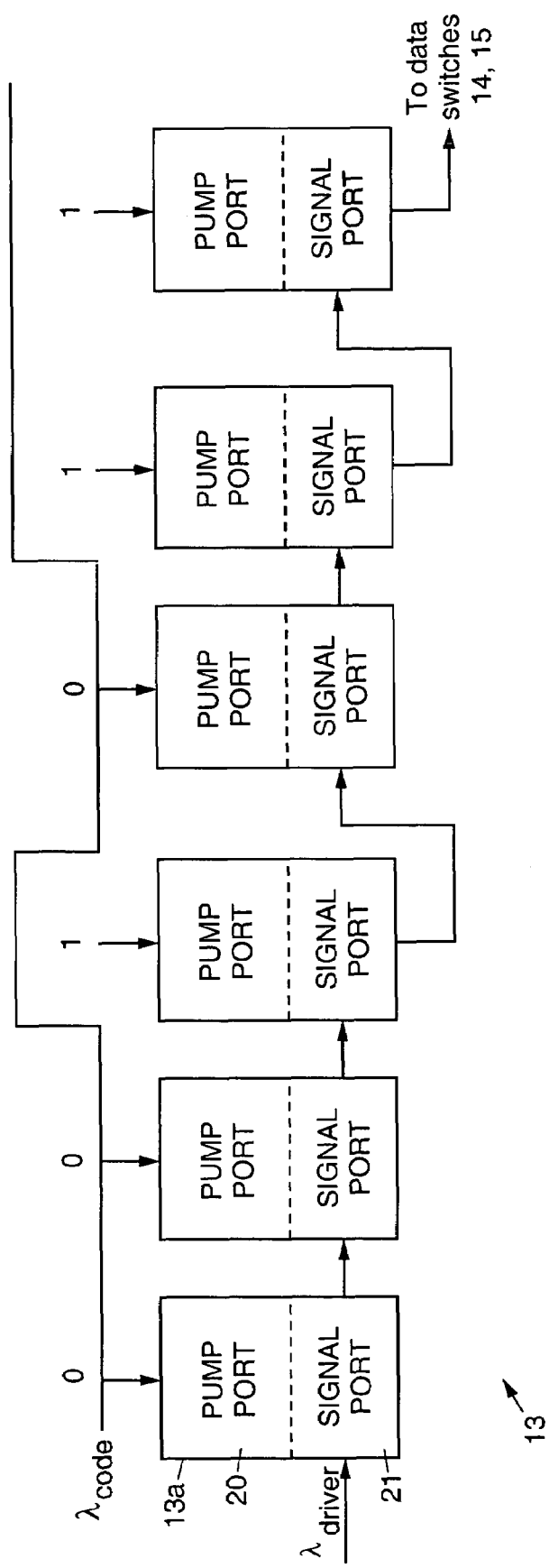

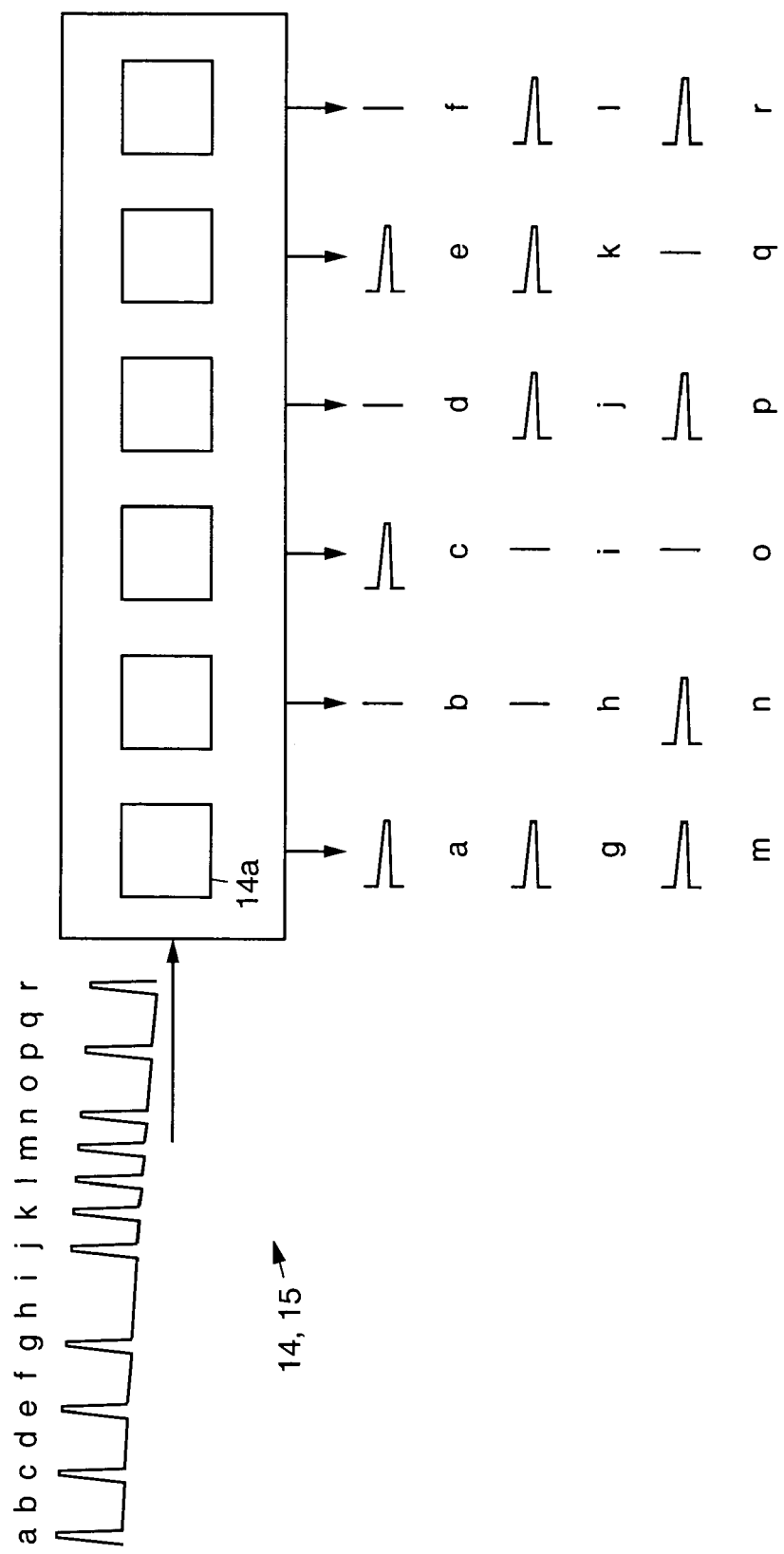

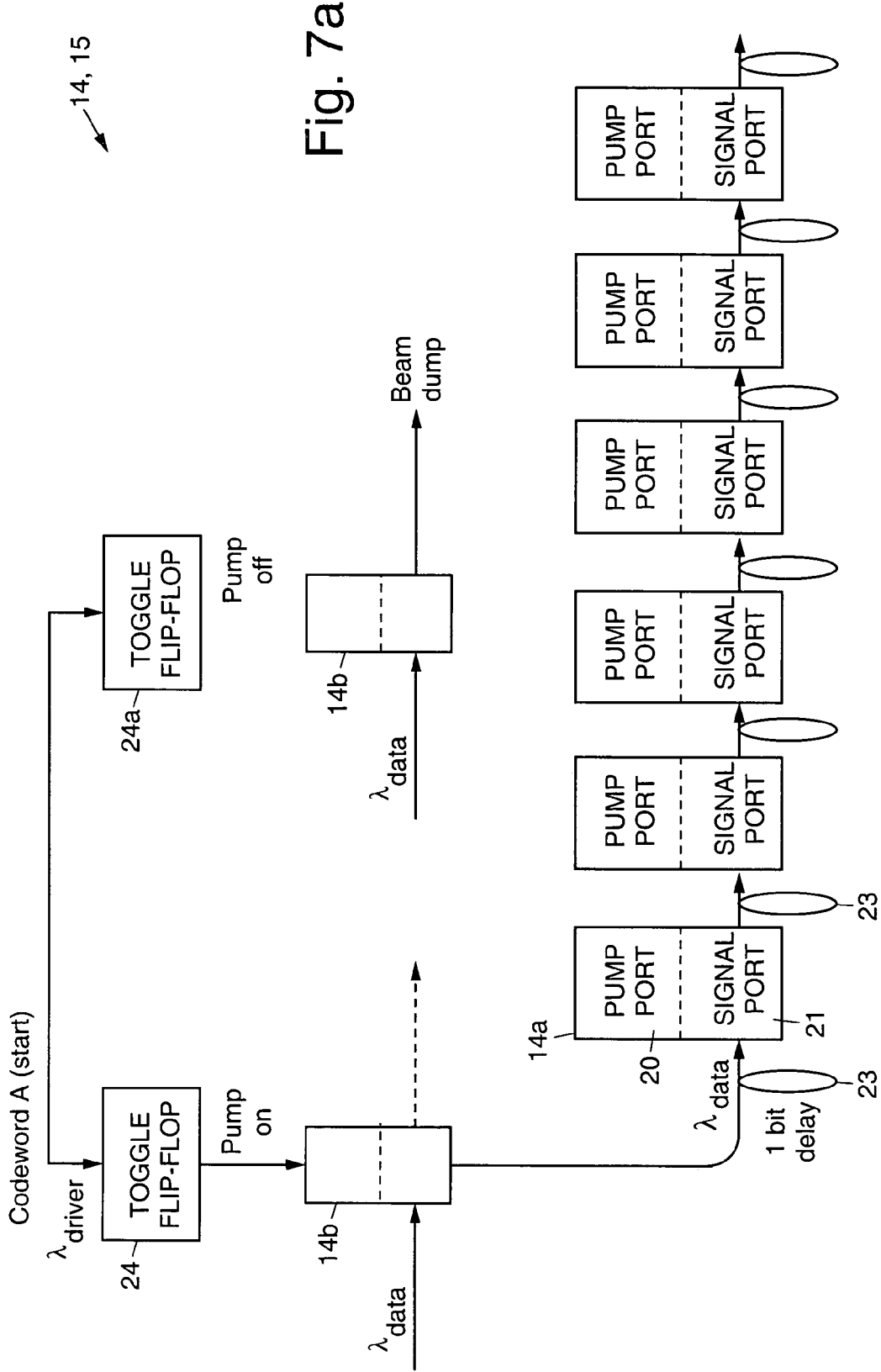

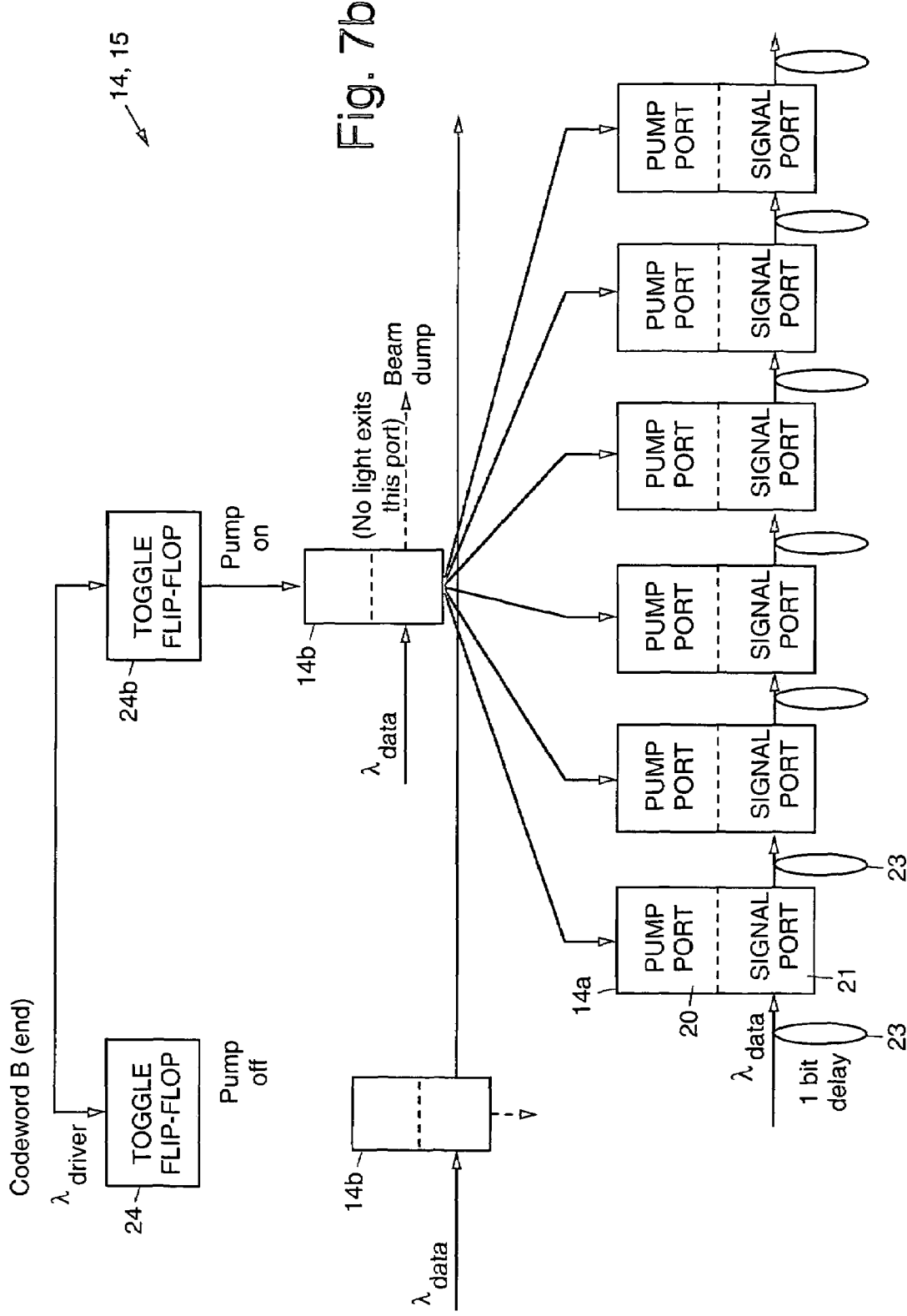

ALL OPTICAL TIME DIVISION MULTIPLEXER AND PACKET SWITCH USING OPTICAL CODEWORDS AND OPTICALLY ACTUATED OPTICAL SWITCHES

BACKGROUND

The present invention relates generally to optical communication devices.

An article relating to the technology implemented by the present invention was written by K. Uchiyama and T. Morioka, entitled "All optical time-division demultiplexing experiment with simultaneous output of all constituent channels from 100 Gb/s OTDM signal", published in Electronics Letters, vol. 37, pp. 642-643 (2003).

SUMMARY OF THE INVENTION

The present invention provides for optical time division demultiplexing and packet switching apparatus. The present invention uses optically-actuated optical switches in conjunction with an optical codeword addressing scheme to implement the all optical time division demultiplexing and switching apparatus.

More particularly, the present invention uses optically actuated optical switches to provide for time division multiplexing and demultiplexing of high data rate optical data. Optical codewords traveling simultaneously with the data on a separate wavelength, in conjunction with the switches, enable the all-optical multiplexing and demultiplexing system. The present invention can also switch packets of data while keeping the data entirely in the optical domain. No optical to electrical conversions are necessary.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates signal outputs of optically actuated optical switches;

FIG. 6 illustrates bit level all optical demultiplexing;

FIG. 7a illustrates that codeword A switches data out of express path and into drop paths;

FIG. 7b illustrates that codeword B switches data back into express path;

DETAILED DESCRIPTION

Figure 1:
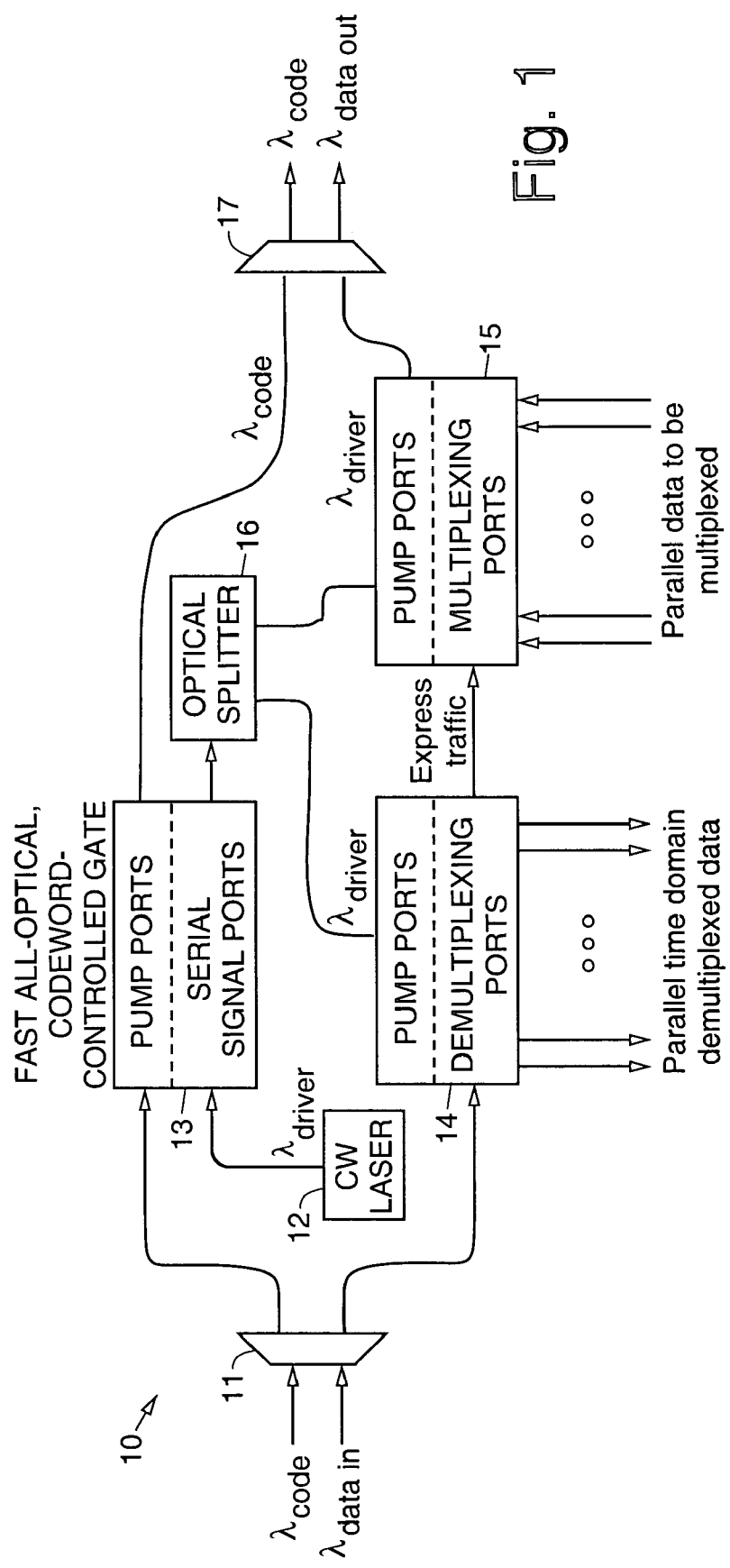
FIG. 1 illustrates exemplary multiplexing and packet switching apparatus in accordance with the principles of the present invention.

Referring to the drawing figures, FIG. 1 illustrates exemplary multiplexing and packet switching apparatus 10 or system 10 in accordance with the principles of the present invention. More specifically, FIG. 1 is a schematic of all optical demultiplexing and packet switching system 10 using optical codewords and optically actuated optical switches 13, 14, 15.

The system 10 comprises an optical input demultiplexer 11 that receives codewords ($\lambda_{code}$) and input data. The codewords are routed to a first optically actuated optical switch 13 that comprises a fast all-optical gate 13. The input data ($\lambda_{data\ in}$) is routed to a first optically actuated optical switch 14 that comprises a demultiplexing device 14. Data is output from the demultiplexing device 14 to a third optically actuated optical switch that comprises a multiplexing device 15.

A CW laser 12 outputs a CW laser signal ($\lambda_{driver}$) that is shuttered by the fast all-optical gate 13. The opening and closing of the gate 13 is controlled by a codeword, which enters on a red wavelength, for example. A correct codeword opens up the gate 13 and allows the driver signal through in the form of a pulse. The pulse duration is equal to the time the gate 13 is open. The driver pulse is split by an optical splitter 16 and is coupled to the demultiplexing and multiplexing devices 14, 15.

Data enters the system 10 on a blue wavelength simultaneously with the codeword. As long as the driver gate 13 is closed, the driver pulse does not pump the demultiplexing and multiplexing devices 14, 15, shown at the lower part of FIG. 1, and data passes through the demultiplexing and multiplexing devices 14, 15 unaffected as express traffic. When the driver gate 13 is opened by the correct codeword, the driver pulse pumps both devices 14, 15, causing them to change states. Data is dropped off the demultiplexing device 14, in a set of parallel lines and new data is multiplexed by the multiplexing device 15 onto an outbound line into the now empty timeslot. The newly multiplexed data and the codeword are multiplexed and output by an optical output multiplexer 17.

Figure 2A:
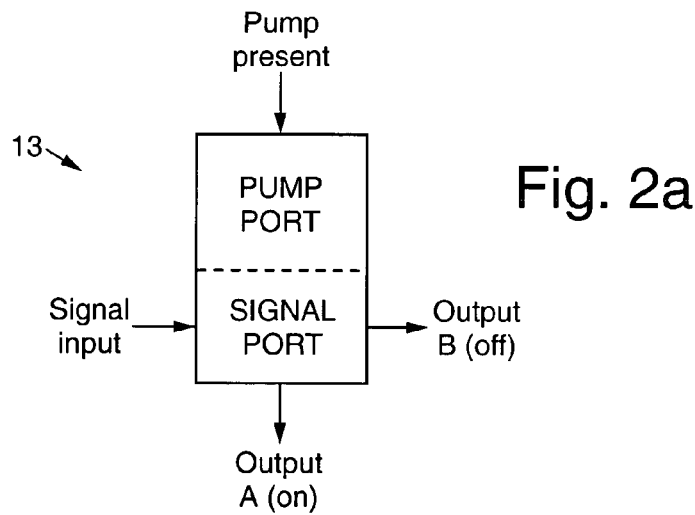
FIGS. 2a and 2b illustrate operation of an optically actuated optical switch employed in the multiplexing and packet switching apparatus shown in FIG. 1.
Figure 2B:
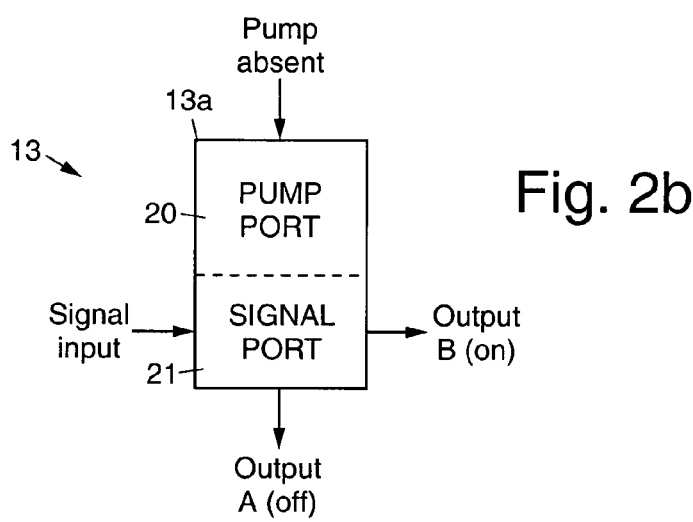

Presented below are details regarding the operation of the driver optical gate 13 and the multiplexing and demultiplexing devices 14, 15. FIGS. 2a, 2b and 3 show details of the driver optical gate 13. FIGS. 2a and 2b illustrates details and operation of the optically actuated optical switch 13. FIGS. 2a and 2b each show a single element switch 13a that makes up the gate 13. The single element switch 13a has a pump port 21 and a signal port 22 having a signal input and two outputs (A, B). The presence of the pump routes the signal to output A as is shown in FIG. 2a, and without the pump, the signal is routed to output B as is shown in FIG. 2b.

FIG. 3 shows a serial chain of switches 13a that comprise the optical gate 13, and how the switches 13a are connected to enable gating operation. FIG. 3 illustrates that the signal outputs of the optically actuated optical switches 13a are wired as a serial switch chain so that the driver signal passes only when the correct pump codeword is incident on the serial switch chain, in this case, a 6 bit word 001011.

The optical switches 13a route the driver signal to one of the two output ports, where the port chosen is determined by the presence or absence of the optical pump. Switches 13a can be coupled together serially, as shown in FIG. 3, in a way that a signal entering the first switch 13a only emerges from the final switch 13a when a specific pump sequence is incident on the switches 13a. This sequence is the codeword for the all-optical gate 13. Other sequences will result in a blocked output at one of the switches 13a in the chain, and will close the gate 13.

Figure 4:
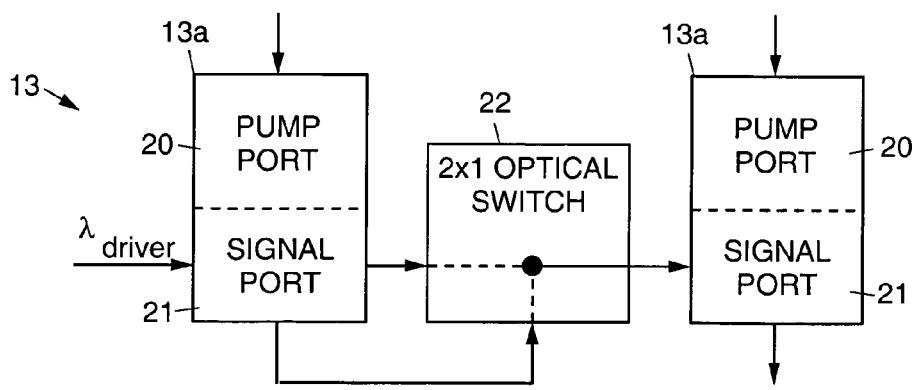
FIG. 4 illustrates how codeword programmability is implemented using the optically actuated optical switches.

Introduction of 2×1 optical switches 22 between the output of each optically actuated optical switch 13 and a subsequent optically actuated optical switch 13 in the chain enable programmability of the codeword, by allowing for flexibility in the coupling (wiring) configuration. This is shown in FIG. 4. The output of the gate 13 (when open) is an optical pulse with a pulse duration equal to one bit of the codeword data rate. The optical delay between each pump port for the switches 13a is equal to the code period (1/code-bit-rate) for synchronization purposes, to guarantee that all switches 13a open at the same time.

Figure 5:
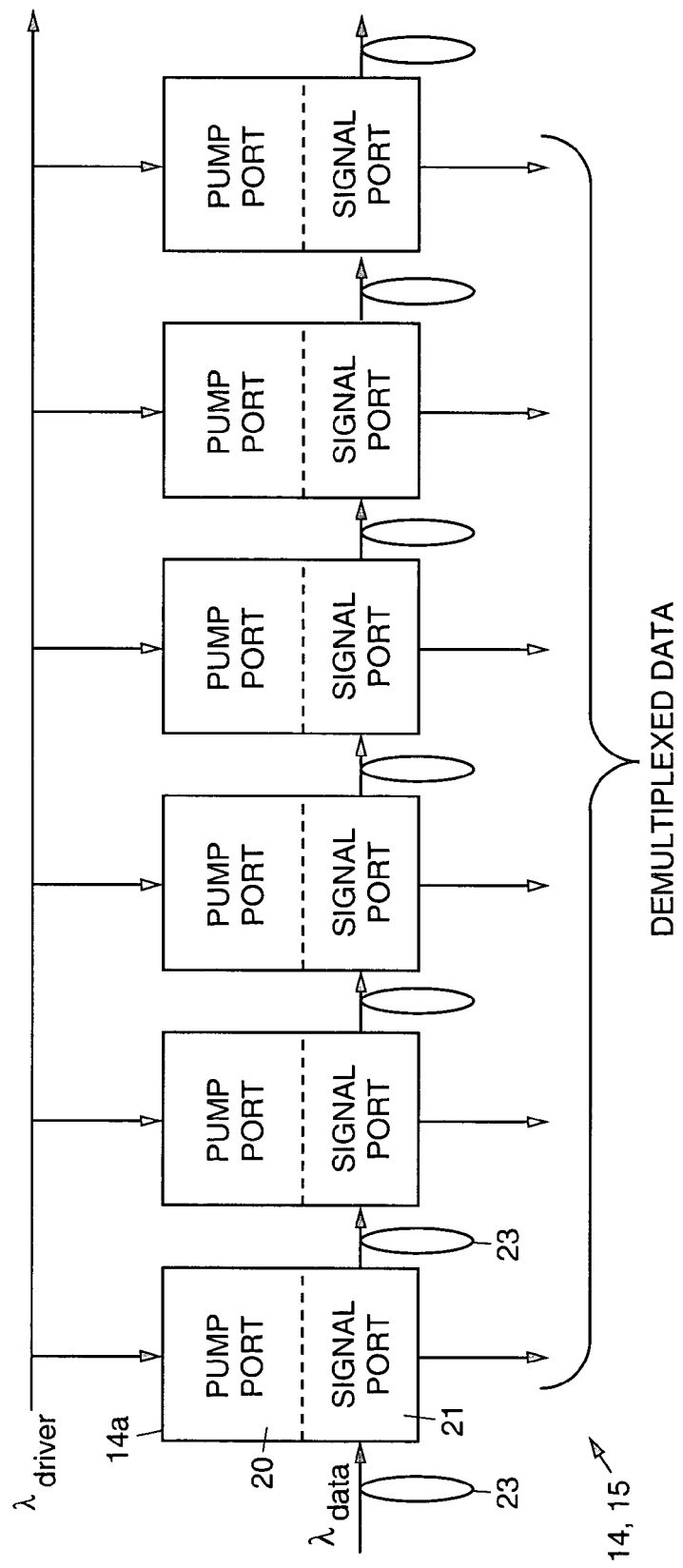
FIG. 5 illustrates an all-optical demultiplexing device employed in the multiplexing and packet switching apparatus shown in FIG. 1.

FIG. 5 illustrates an exemplary all-optical demultiplexing device 14 which comprises a chain of optically actuated optical switches 14a. A driver pulse ($\lambda_{driver}$) from the all-optical gate 13 (FIG. 3), pumps the data switches 14a. For the duration of the driver pulse, data incident on the demultiplexing switches 14a are dropped into parallel paths (shown at the bottom of FIG. 5).

The driver pulse generated at the output of the all-optical gate 13 shown in FIG. 3 pumps the optically actuated optical switches 14a of the demultiplexer 14. When the codeword bit rate is equal to the data rate, a codeword opens the switches 14a for a single bit of data. As is shown in FIG. 5, delay lines 23 between the signal paths of the switches 14a synchronize the opening of the switches 14a with the arrival of a bit such that each port drops a single bit from the data into one of the parallel lines, effectively demultiplexing the serial line. Details of this are shown in FIG. 6.

FIG. 6 illustrates bit level all optical demultiplexing. A serial stream of data comes in and is demultiplexed into N parallel streams, each at a data rate N times smaller than the serial input data.

The system illustrated in FIG. 6 requires an optically actuated optical switch 14a that can switch at a speed equal to the bit rate of the data. A variation of this that switches packet length streams, but still demultiplexes them at the bit-level, can be made using switches 14a that switch at the packet timescale. This is advantageous because realizing an optically actuated optical switch 14a with a switch time on the order of a bit, for the data rates of interest in the all-optical domain (~100 Gb/s) is challenging. Packet length switch speeds (~1 Gb/s), on the other hand, are more realistic, and previous work has established this capability. This is illustrated in FIGS. 7a and 7b, and is based on integrating a latching mechanism into the design of the demultiplexing device 14 (and the multiplexing device 15).

FIG. 7a illustrates that codeword A switches data out of the express path and into drop paths out of the demultiplexing device 14. A first toggle flip-flop 24 serves to latch a data routing switch 14b that routes the data between express and drop ports, and the data routing switch 14b stays open until the correct codeword closes it (see FIG. 7b). The driver pulse is also connected to a second toggle flip flop 24a, which is set to the off state by the codeword; the output of the second toggle flip flop 24a is diverted in this state to a beam dump.

FIG. 7b illustrates that codeword B switches data back into express path. Simultaneously, the codeword turns the second toggle flip flop 24a on, which routes a pump pulse to the data switches 14a, effecting a drop of the data held in the delay loops 23. As long as the following data gets switched into the express path, the duration of the output of the second toggle flip flop 24a can be much longer that the bit length of the data that is dropped (only the data in the delay loops 23 gets dropped). The beam dump shown in FIG. 7b is not used, since light is not routed there for this configuration.

In the configuration shown in FIG. 7b, the arrow from the left side switch 25 crosses over the signal line to illustrate that in this configuration, light from the left-side switch 14b is routed out of the right output port (on left-side switch 14b), and not to the switches 14a.

FIG. 7a shows that the "start" codeword initiates a process whereby data is routed towards the set of delay loops 23 and drop switches 14a. The delay loops 23 are similar to those shown in FIG. 5 and introduce a 1 bit delay between successive switches 14a. The delay loops 23 are filled with the bits to be dropped, and when the "end" codeword appears, the optically actuated optical switches 14a to which they are connected change state, and the bits are dropped. The minimum length of the packet that can be dropped and demultiplexed is limited by the switch speed of the optically actuated optical switches 14a. The maximum packet length is set by the total number of switches 14a (or alternatively, by the number of delay loops 23). A range of switchable packet lengths is therefore enabled, where the low end of the range is set by the speed of the switches 14a and the high end is set by the number of switches 14a.

When data is dropped, an empty time-slot is available for new data to be added in. That data can be added in using a coupler on the mainline, or with a multiplexing device similar to the demultiplexing device 14, where the driver pulse opens a bank of switches, as shown in FIG. 1. The latter scenario requires that the optically actuated switches 14a work in a 2×1 mode as well as the 1×2 mode required for demultiplexing.

For more generalized packet routing purposes, it may be desirable to switch just one stream of packets out of the main line, and it may not be necessary to demultiplex them. In this case, only the single data routing switch 14b is required. While the demultiplexing capability is not achieved, the technique allows for variability in the switched packet length. A more detailed schematic of this is shown in FIG. 8.

The correct codeword toggles the pump on, and leaves it on until the codeword appears again, at which point the pump is toggled off. This enables packet lengths as short as the period of the code wavelength bit rate, but longer ones also, with a granularity of one period. The first toggle flip flop 24 can be an all-optical device or can use optical to electrical conversion and standard electronic logic, for example.

Figure 8A:
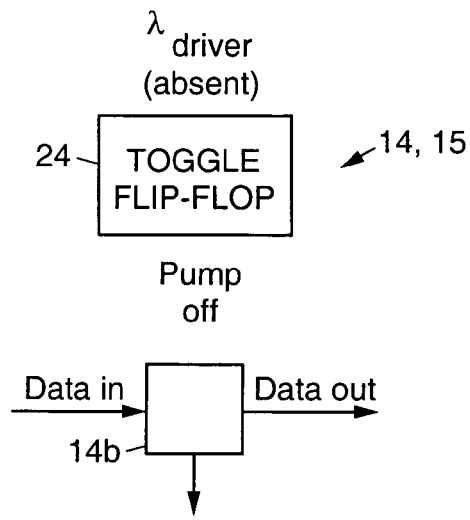
FIG. 8a illustrates a toggle flip flop permitting variability in the length of the packet being routed. (a) Data routed out port 1.
Figure 8B:
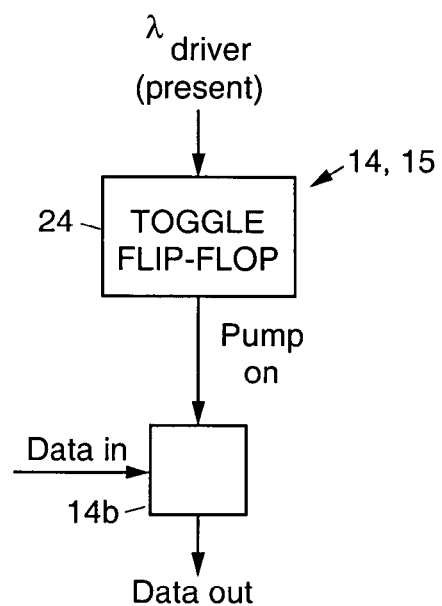
FIG. 8b illustrates that driver pulse changes state of toggle flip-flop, turns pump on, data routed out port 2.
Figure 8C:
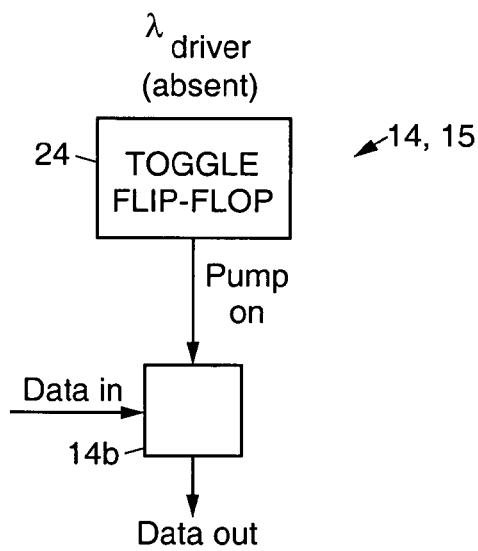
FIG. 8c illustrates that driver pulse off toggle flip-flop maintains state with pump on, data continues to be routed out port 2.
Figure 8D:
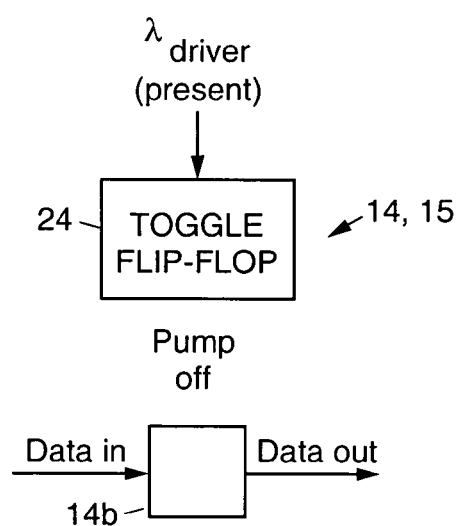
FIG. 8d illustrates that driver pulse on, changes state of toggle flip-flop, turns pump laser off, data routed out port 1.

More particularly, FIGS. 8a-8d illustrate a toggle flip flop 24 that permits variability in the length of the packet that is routed. FIG. 8a illustrates that data is routed out of port B. FIG. 8b illustrates that the driver pulse changes state of first toggle flip-flop 24, turns the pump on, and data is routed out of port A. FIG. 8c illustrates that the driver pulse is off, the first toggle flip-flop 24 maintains state with the pump on, and data continues to be routed out of port A. FIG. 8d illustrates that the driver pulse is on, changes state of the first toggle flip-flop 24, turns the pump laser off, and data is routed out of port B.

As should be clear from the above discussion, the all optical multiplexing and packet switching solution provided by the present invention permits high speed demultiplexing with moderate speed switches. The present invention may be used in data transmission and communication, optical networking, photonics and optical computing systems, and the like.

Thus, optical multiplexing and packet switching apparatus have been disclosed. It is to be understood that the described embodiments are merely illustrative of some of the many specific embodiments which represent applications of the principles of the present invention, such as open stub reflection circuits and logic pulse generation circuits, for example. Clearly, numerous and other arrangements can be readily devised by those skilled in the art without departing from the scope of the invention.

What is claimed is:

1. Optical apparatus, comprising:
a continuous-wave laser that outputs a continuous-wave driver signal;
a codeword controlled optically actuated optical gate that comprises a plurality of serially coupled optically actuated optical switches that each comprise a signal port for receiving the driver signal, first and second output ports, and a pump port for receiving the codeword that selectively outputs the driver signal by way of either the first or second output ports as a function of the codeword;
a demultiplexer that comprises a serially coupled chain of one bit optical delays coupled to data input ports of optically actuated optical switches that each comprise a pump port that receives the driver signal output by the gate, a data input port for receiving input data, a plurality of demultiplexing ports for outputting demultiplexed data, and a plurality of through ports for outputting the input data;
a multiplexer that comprises a serially coupled chain of one bit optical delays coupled to data input ports of optically actuated optical switches that each comprise a pump port that receives the driver signal output by the gate, a data input port for receiving input data output by the demultiplexer, a plurality of multiplexing ports for receiving parallel data that is to be multiplexed, and a plurality of through ports for outputting multiplexed data.

2. The apparatus recited in claim 1 wherein the codewords have a red wavelength and the input data has a blue wavelength.

3. The apparatus recited in claim 1 wherein the codewords and input data are received simultaneously.

4. The apparatus recited in claim 1 further comprising:
an optical splitter coupled between the optical gate and pump ports of the demultiplexer and multiplexer.

5. The apparatus recited in claim 1 further comprising:
an input multiplexer for receiving the codewords and input data; and
an output multiplexer for combining the codewords and output data.

6. The apparatus recited in claim 1 further comprising:
a plurality of 2×1 optical switches that interconnect a plurality of serially coupled optically actuated optical switches.

7. The apparatus recited in claim 1 further comprising:
first and second toggle flip-flops coupled between the optical gate and the pump port of the serially coupled optically actuated optical switches of the demultiplexer.

8. Optical apparatus, comprising:
a continuous-wave laser that outputs a continuous-wave driver signal;
a codeword controlled optically actuated optical gate that comprises a plurality of 2×1 optical switches that interconnect a plurality of serially coupled optically actuated optical switches that each comprise a signal port for receiving the driver signal, first and second output ports, and a pump port for receiving the codeword that selectively outputs the driver signal by way of either the first or second output ports as a function of the codeword;
a demultiplexer that comprises a serially coupled chain of one bit optical delays coupled to data input ports of optically actuated optical switches that each comprise a pump port that receives the driver signal output by the gate, a data input port for receiving input data, a plurality of demultiplexing ports for outputting demultiplexed data, and a plurality of through ports for outputting the input data;
a multiplexer that comprises a serially coupled chain of one bit optical delays coupled to data input ports of optically actuated optical switches that each comprise a pump port that receives the driver signal output by the gate, a data input port for receiving input data output by the demultiplexer, a plurality of multiplexing ports for receiving parallel data that is to be multiplexed, and a plurality of through ports for outputting multiplexed data.

9. The apparatus recited in claim 8 wherein the codewords have a red wavelength and the input data has a blue wavelength.

10. The apparatus recited in claim 8 wherein the codewords and input data are received simultaneously.

11. The apparatus recited in claim 8 further comprising:
an optical splitter coupled between the optical gate and pump ports of the demultiplexer and multiplexer.

12. The apparatus recited in claim 8 further comprising:
an input multiplexer for receiving the codewords and input data; and
an output multiplexer for combining the codewords and output data.

13. The apparatus recited in claim 8 further comprising:
first and second toggle flip-flops coupled between the optical gate and the pump port of the serially coupled optically actuated optical switches of the demultiplexer.

* * * * *